(12) United States Patent
Fear

(10) Patent No.: US 10,258,886 B2
(45) Date of Patent: Apr. 16, 2019

(54) DYNAMIC INTERFACE CONTROL DEVICE MAPPING WHEN GAME SHARING

(71) Applicant: Nvidia Corporation, Santa Clara, CA (US)

(72) Inventor: Andrew Fear, Austin, TX (US)

(73) Assignee: Nvidia Corporation, Santa Clara, CA (US)

(*) Notice: Subject to any disclaimer, the term of this patent is extended or adjusted under 35 U.S.C. 154(b) by 228 days.

(21) Appl. No.: 15/043,797

(22) Filed: Feb. 15, 2016

(65) Prior Publication Data

US 2016/0158653 A1    Jun. 9, 2016

Related U.S. Application Data

(63) Continuation-in-part of application No. 14/698,163, filed on Apr. 28, 2015, which is a continuation-in-part of application No. 14/017,695, filed on Sep. 4, 2013, now Pat. No. 9,813,254.

(51) Int. Cl.
| | |
|---|---|
| A63F 9/24 | (2006.01) |
| A63F 13/71 | (2014.01) |
| H04L 29/06 | (2006.01) |
| A63F 13/795 | (2014.01) |
| A63F 13/355 | (2014.01) |
| A63F 13/35 | (2014.01) |
| A63F 13/45 | (2014.01) |
| A63F 13/30 | (2014.01) |
| A63F 13/23 | (2014.01) |
| H04N 7/15 | (2006.01) |

(52) U.S. Cl.
CPC ............ *A63F 13/71* (2014.09); *A63F 9/24* (2013.01); *A63F 13/30* (2014.09); *A63F 13/35* (2014.09); *A63F 13/355* (2014.09); *A63F 13/45* (2014.09); *A63F 13/795* (2014.09); *H04L 67/38* (2013.01); *A63F 13/23* (2014.09); *A63F 2009/2488* (2013.01); *A63F 2300/5533* (2013.01); *H04N 7/155* (2013.01)

(58) Field of Classification Search
CPC .......... A63F 13/71; A63F 13/30; A63F 13/35; A63F 13/355; A63F 13/45; A63F 13/795; A63F 13/23; A63F 2009/2488; A63F 2300/5533
See application file for complete search history.

(56) References Cited

U.S. PATENT DOCUMENTS

| | | |
|---|---|---|
| 7,497,776 B1 | 3/2009 | Roman |
| 8,490,012 B2 | 7/2013 | Marinkovich et al. |
| 9,158,746 B2 | 10/2015 | Bartek et al. |
| 9,280,529 B2 | 3/2016 | Lemonik et al. |
| 9,421,455 B1 | 8/2016 | Connor et al. |
| 9,616,341 B2 | 4/2017 | Connor et al. |

(Continued)

OTHER PUBLICATIONS

Hsih-Chia Fu; "Interactive Video Platform for E-Learning and Remote Services"; IJCSI International Journal of Computer Science Issues, vol. 10; Issue 1; No. 1; pp. 154-161; Jan. 2013.

*Primary Examiner* — Omkar A Deodhar
*Assistant Examiner* — Shauna-Kay Hall
(74) *Attorney, Agent, or Firm* — Kevin Brown; Parker Justiss, P.C.

(57) ABSTRACT

An electronic computing system for dynamically controlling user interface device settings for an electronic game playable by multiple players over a computer network.

20 Claims, 5 Drawing Sheets

(56) References Cited

U.S. PATENT DOCUMENTS

Figure 1:
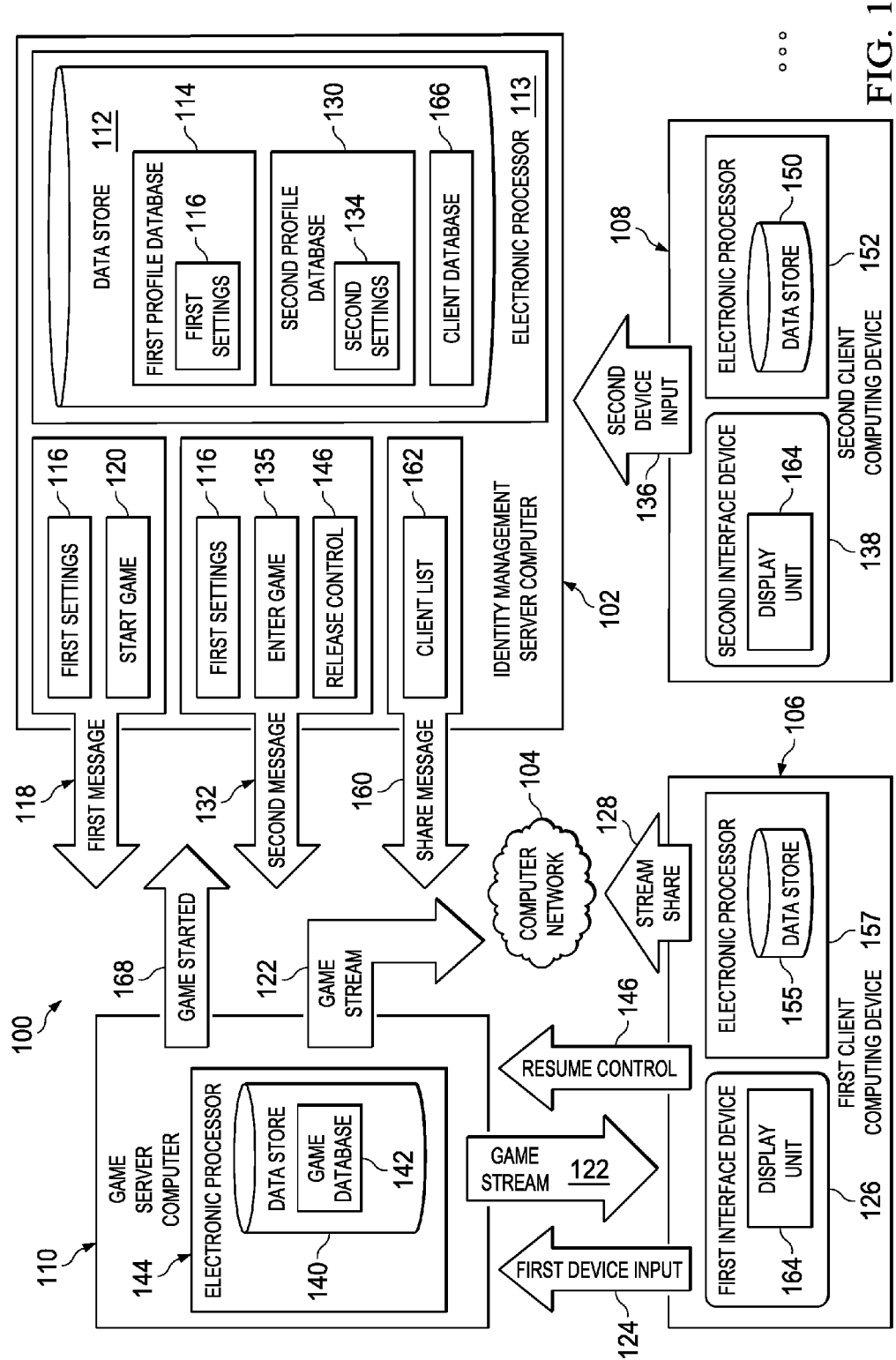

| | | |
|---|---|---|
| 9,987,561 B2 | 6/2018 | Huang et al. |
| 2002/0169617 A1 | 11/2002 | Luisi |
| 2003/0199319 A1 | 10/2003 | Culbert |
| 2005/0227766 A1 | 10/2005 | Kaminagayoshi |
| 2005/0272505 A1 | 12/2005 | Okamura |
| 2006/0005240 A1 | 1/2006 | Sundarrajan et al. |
| 2006/0282774 A1 | 12/2006 | Covell et al. |
| 2008/0158232 A1 | 7/2008 | Shuster |
| 2008/0263460 A1 | 10/2008 | Altberg et al. |
| 2008/0278448 A1 | 11/2008 | Nilsagard et al. |
| 2009/0112906 A1 | 4/2009 | Shuster |
| 2009/0249224 A1 | 10/2009 | Davis et al. |
| 2010/0045697 A1 | 2/2010 | Reville et al. |
| 2010/0303444 A1 | 2/2010 | Sasaki et al. |
| 2010/0138432 A1 | 6/2010 | Noyes |
| 2010/0142447 A1 | 6/2010 | Schlicht et al. |
| 2010/0273553 A1 | 10/2010 | Zalewski |
| 2011/0022673 A1 | 1/2011 | Lueth et al. |
| 2011/0078246 A1 | 3/2011 | Dittmer-Roche |
| 2011/0086706 A1 | 4/2011 | Zalewski |
| 2011/0122063 A1 | 5/2011 | Periman et al. |
| 2012/0102418 A1 | 4/2012 | Joy et al. |
| 2012/0110443 A1 | 5/2012 | Lemonik et al. |
| 2012/0184373 A1 | 7/2012 | Kim et al. |
| 2012/0252580 A1 | 10/2012 | Dugan |
| 2012/0278731 A1 | 11/2012 | Marinkovich et al. |
| 2013/0079132 A1* | 3/2013 | Archer .................. A63F 13/358 463/31 |
| 2013/0084985 A1* | 4/2013 | Green ...................... A63F 9/24 463/40 |
| 2013/0106989 A1 | 5/2013 | Gage et al. |
| 2013/0198273 A1 | 8/2013 | Vago et al. |
| 2013/0244794 A1 | 9/2013 | Yahiro |
| 2013/0260892 A1 | 10/2013 | Ikeda |
| 2013/0263005 A1* | 10/2013 | Kreiner ............... G06F 3/04817 715/727 |
| 2013/0339847 A1 | 12/2013 | Bartek et al. |
| 2013/0344960 A1 | 12/2013 | Perry et al. |
| 2014/0208163 A1 | 7/2014 | Domke et al. |
| 2015/0067745 A1 | 3/2015 | Fear |
| 2015/0080123 A1 | 3/2015 | Motokura et al. |
| 2015/0157928 A1 | 6/2015 | Hall et al. |
| 2015/0238859 A1 | 8/2015 | Fear |
| 2015/0238875 A1 | 8/2015 | Fear |
| 2015/0304605 A1 | 10/2015 | Hartman et al. |
| 2015/0321098 A1 | 11/2015 | van der Laan et al. |
| 2015/0372845 A1 | 12/2015 | Yoshimochi et al. |
| 2015/0375117 A1 | 12/2015 | Thompson et al. |
| 2016/0044073 A1 | 2/2016 | Rosenberg |
| 2016/0170616 A1 | 6/2016 | Rosenberg |
| 2016/0287988 A1 | 10/2016 | Huang et al. |
| 2016/0287996 A1 | 10/2016 | Huang et al. |
| 2016/0294899 A1 | 10/2016 | Huang et al. |
| 2016/0375363 A1 | 12/2016 | Connor et al. |
| 2017/0080340 A1 | 3/2017 | Dugan |

* cited by examiner

DYNAMIC INTERFACE CONTROL DEVICE MAPPING WHEN GAME SHARING

CROSS-REFERENCE TO RELATED APPLICATION

This application is a continuation-in-part of U.S. patent application Ser. No. 14/698,163, filed by Fear on Apr. 28, 2015, entitled "SYSTEM AND METHOD FOR GRANTING REMOTE ACCESS TO A VIDEO GAME EXECUTED ON A VIDEO GAME CONSOLE OR NETWORK CLIENT," which in turn, is a continuation-in-part of U.S. patent application Ser. No. 14/017,695, filed by Fear on Sep. 4, 2013, entitled, "SYSTEM AND METHOD FOR PROVIDING REAL-TIME ASSISTANCE REGARDING A CLOUD-BASED APPLICATION," both of which are commonly assigned with this application and are incorporated by reference herein in their entirety.

TECHNICAL FIELD

This application is directed, in general, to on-line gaming and, more specifically, to a method and system for dynamically controlling access to electronic games executed on a computer network.

BACKGROUND

The number of individuals playing on-line electronic games over a computer network, such as the internet, is growing in popularity. Often a person attempting to play a game that they are inexperienced with is not very good at playing the game and they seek, via the network, instructions from another person with more experience playing the game.

SUMMARY

One aspect provides an electronic computing system for dynamically controlling user interface device settings for an electronic game playable by multiple players over a computer network. The system comprises an identity management server computer connectable by a computer network to a plurality of client computing devices and a game server computer. The identity management server computer is configured to retrieve, from a data store, a first client account profile associated with account login information provided from a first one of the client computing devices, the first client account profile having a record of first client interface device settings for an electronic game. The identity management server computer is configured to send a first game-entitlement confirmation message towards the game server computer. The first message includes the first client interface device settings for the electronic game and a start-game authorization command to instruct the game server computer to send a game stream of the electronic game towards the first client computing device and to accept first input commands from a first client interface device configured to alter the game stream, the first input commands mapped according to the first client interface device settings. The identity management server computer is configured to upon receiving a game stream-share authorization message from the first client computing device to retrieve from the data store, a second client account profile associated with account login information provided from a second one of the client computing devices. The second client account profile has a record of second client interface device settings for the electronic game. Upon receiving a game stream-share authorization message the identity management server computer is configured to send a second game-entitlement confirmation message towards the game server computer. The second message includes the second client interface device settings for the electronic game and an enter-game authorization command to instruct the game server computer to send the on-going game stream towards the second client computing device and to accept second input commands from a second client interface device to alter the on-going game stream, the second input commands mapped according to the second client interface device settings.

Another aspect provides a method for dynamically controlling user interface device settings for an electronic game playable by multiple players over a computer network. The method comprises retrieving from a data store of the identity management server computer, a first client account profile associated with the account login information, the first client account profile having a record of first client interface device settings for an electronic game. The method comprises sending a first game-entitlement confirmation message from the identity management server computer towards a game server computer via a computer network. The first message includes the first client interface device settings for the electronic game and start-game instructions that causes the game server computer to send a game stream of the electronic game towards the first client computing device and to accept input commands from a first client interface device to alter the game steam, the input commands mapped according to the first client interface device settings. The method comprises receiving to the identity management server computer, a game stream-share authorization message from the first client computing device. Upon receiving the game stream-share authorization message the identity management server computer retrieves from the data store, a second client account profile associated with account login information provided from a second one of the client computing devices, the second client account profile having a record of second client interface device settings for the electronic game. Upon receiving the game stream-share authorization message the identity management server computer sends a second game-entitlement confirmation message towards the game server computer. The second message includes the second client interface device settings for the electronic game and an enter-game authorization command that causes the game server computer to send the on-going game stream towards the second client computing device and to accept input commands from a second client interface device to alter the on-going game steam, the input commands mapped according to the second client interface device settings.

BRIEF DESCRIPTION

Figure 2:
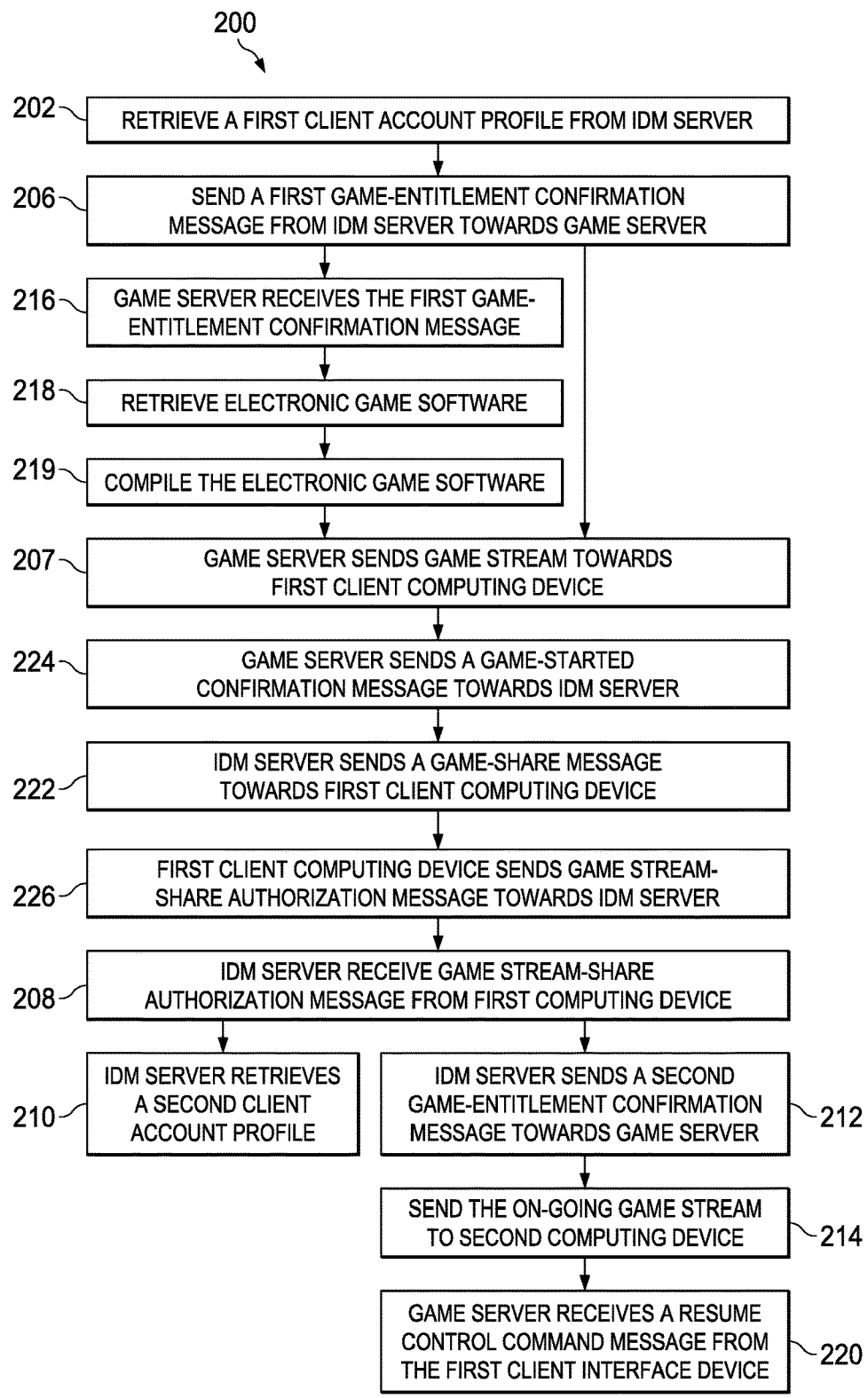
Figure 3:
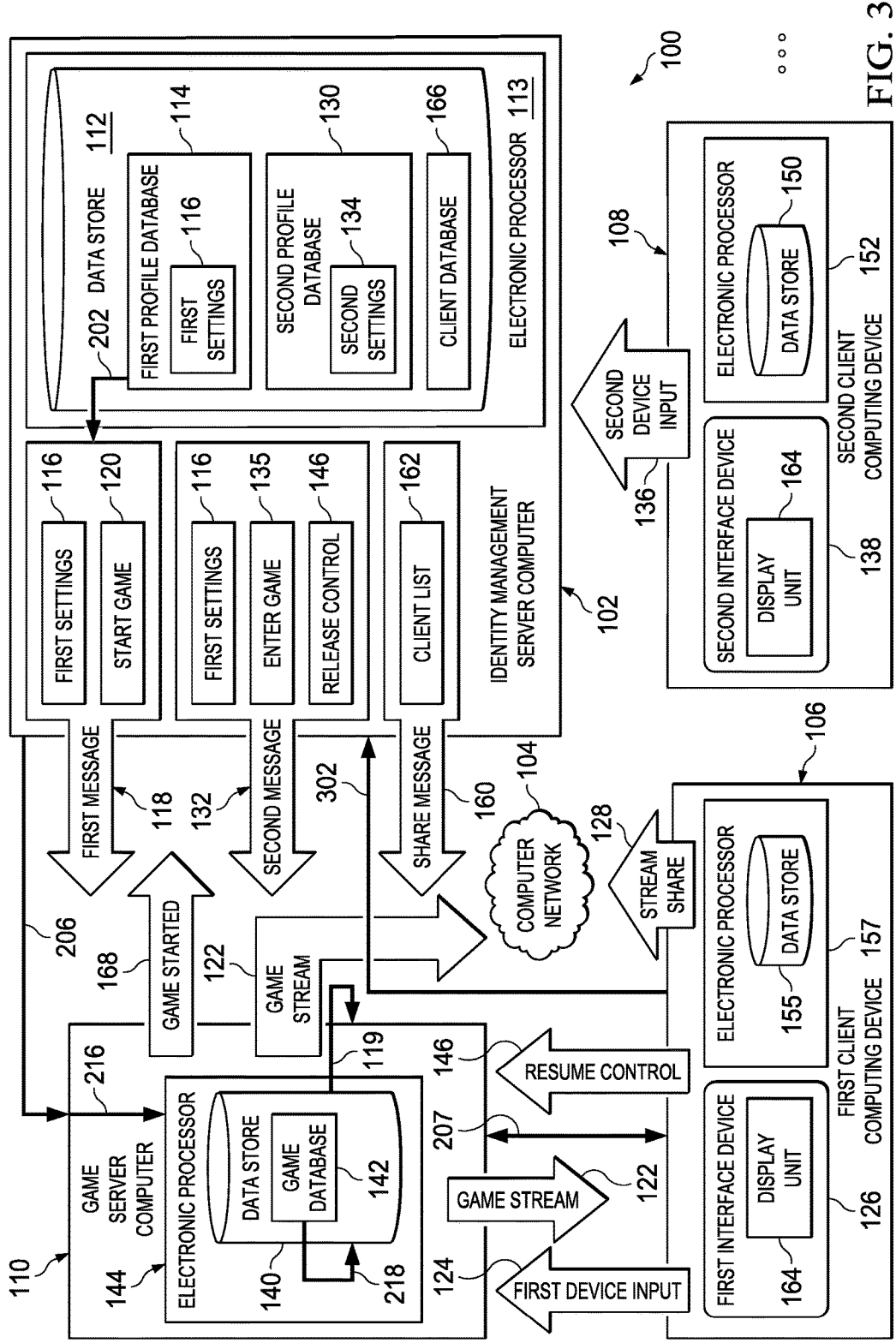
Figure 4:
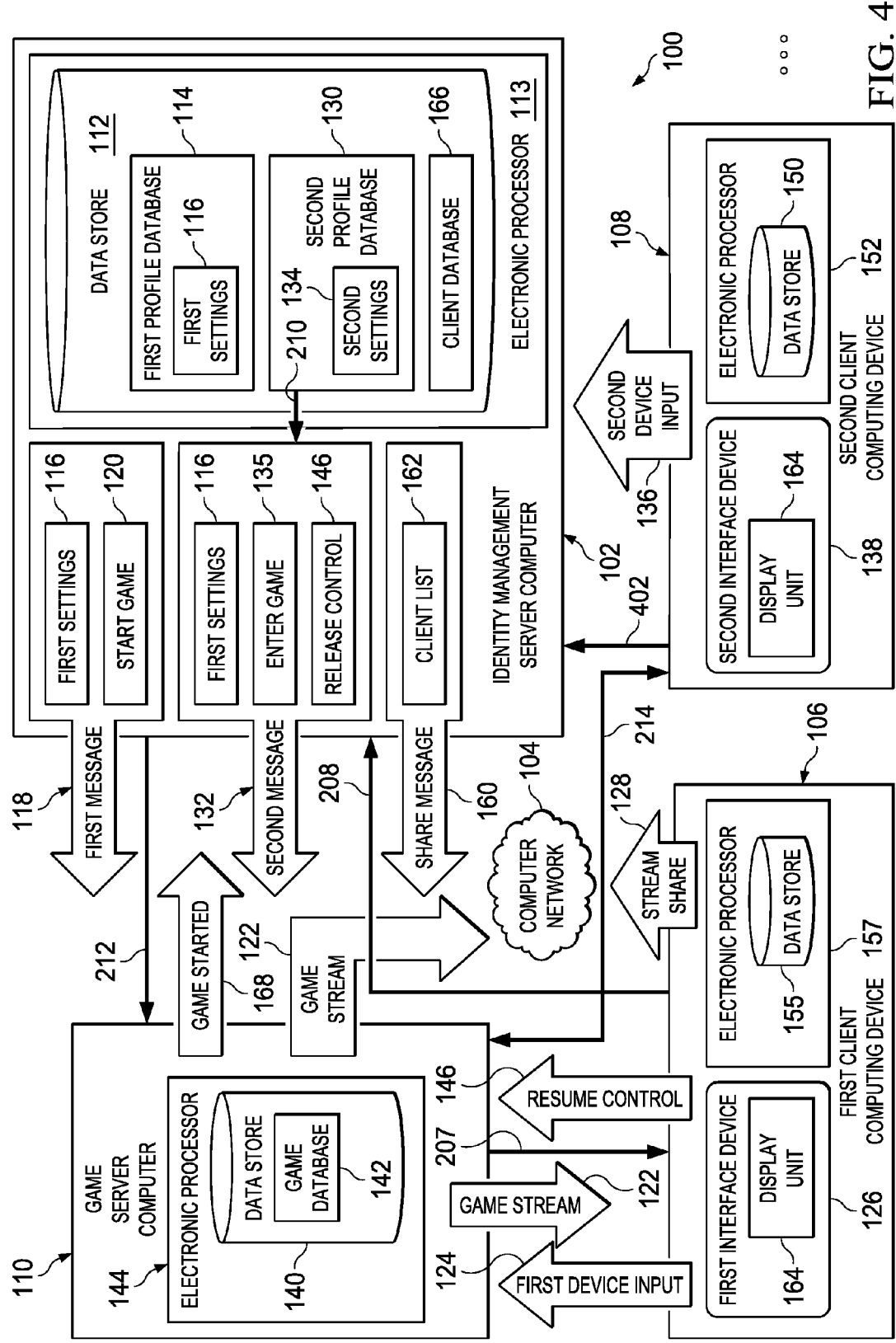
Figure 5:
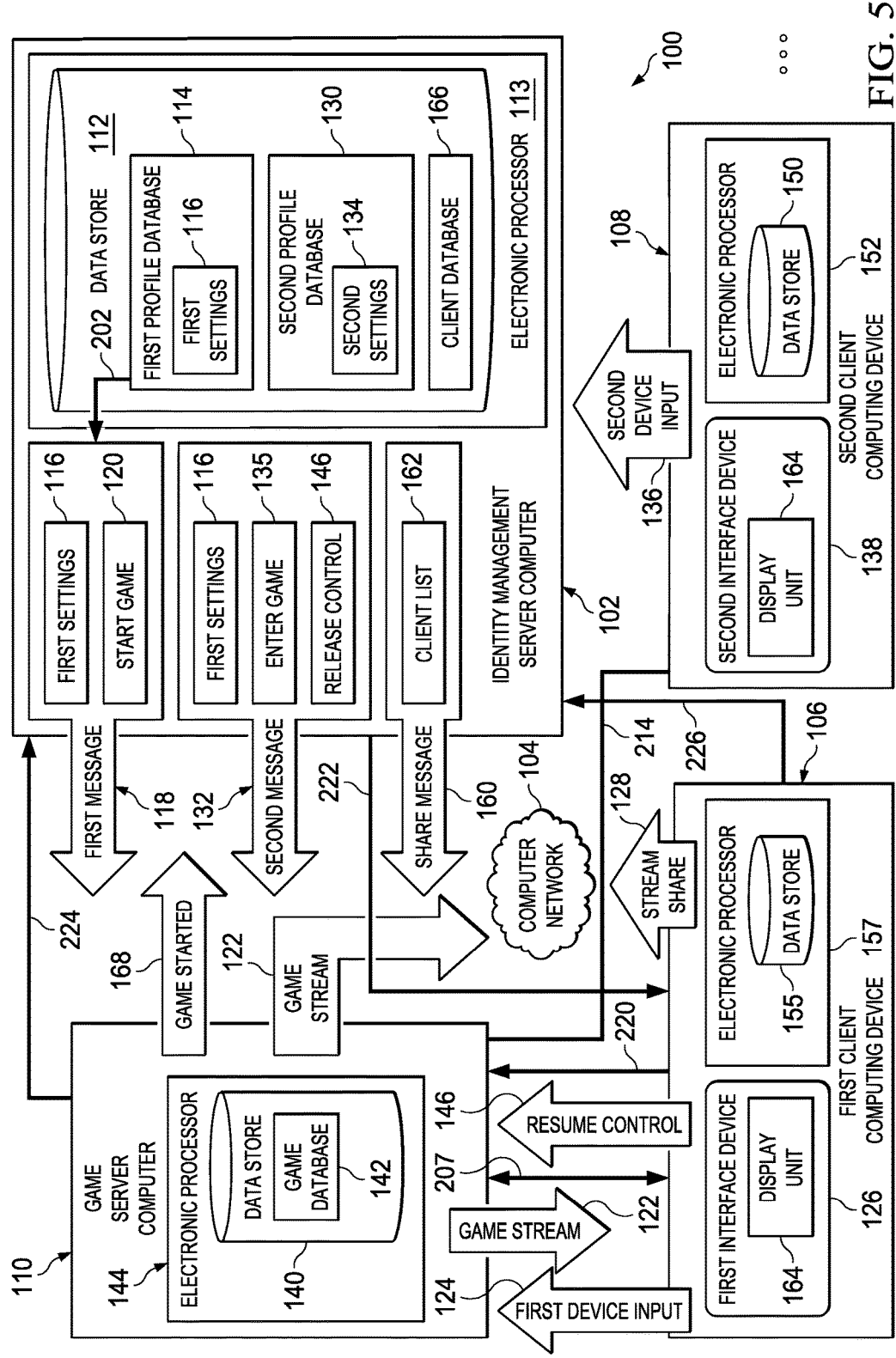

Reference is now made to the following descriptions taken in conjunction with the accompanying drawings, in which:

FIG. 1 presents a block diagram of an example embodiment of an electronic computer system for dynamically controlling user interface device settings for an electronic game playable by multiple players over a computer network, according to the principles of the present invention;

FIG. 2 presents a flow diagram of example embodiments of a method for dynamically controlling user interface device settings for an electronic game played by multiple players over a computer network, according to the principles of the present invention;

FIG. 3 presents a block diagram of an example embodiment of the electronic computer system such as depicted in FIG. 1, at one stage in implementing an example embodiment of the method such as presented in FIG. 2;

FIG. 4 presents a block diagram the same electronic computer system as depicted in FIG. 3 at another stage in implementing the example embodiment of the method; and FIG. 5 presents a block diagram the same electronic computer system as depicted in FIG. 5 at another stage in implementing the example embodiment of the method.

DETAILED DESCRIPTION

This invention addresses situations where an inexperienced player, who is not in the same location as an experienced player, shares over a network an on-going game with the experienced player in order, at least in part, to get instructions. The inventor recognized that in such situations, simply sharing a game is insufficient for imparting instructions efficiently. For instance, the client interface device settings used to play the game by the inexperienced player is not likely to be the same as that normally used by the experienced player. Consequently, the effectiveness of an instruction session is diminished because the experienced player is not using their familiar settings, and, the inexperienced player cannot see how their own settings would be applied to the game based on the instructions. Although the experienced player could modify the inexperienced player's interface device settings to their own liking, it takes time to make these changes, and, the inexperienced player will not be familiar with the modified settings and therefore have difficulty understanding and implementing the experienced player's instructions.

Embodiments of the invention, as further described herein, facilitate an experienced game player to impart their instructions to an inexperienced player by assuming control of an on-going game stream that was started by the inexperienced player. Rather than using the inexperienced player's interface device settings, however, the experienced player's own interface device settings are used while the experienced player is controlling the on-going game stream. Game control commands sent from the two players can be dynamically mapped, according to the two player's different interface device settings, to alter the on-going game stream, as control of the on-going game stream is shifted back and forth between players, while the other player watches the game stream. Accordingly, the experienced player's instructions on how to play the game are made more efficient than hitherto possible.

One embodiment of the invention is an electronic computing system for dynamically controlling user interface device settings for an electronic game playable by multiple players over a computer network. FIG. 1 presents a block diagram of an example embodiment of the system 100.

With continuing reference to FIG. 1 throughout, the example system 100 can comprise an identity management server computer 102. The identity management server computer 102 can be connected by a computer network 104 to a plurality of client computing devices, e.g., first and second computing devices 106, 108, etc. . . . and a game server computer 110. The identity management server computer 102 is configured to retrieve, from a data store (e.g., data store 112 in communication with an electronic processing unit 113) of the identity management server computer 102, a first client account profile data base (e.g., first profile database 114) associated with account login information provided from a first one of the client computing devices 106, the first client account profile database 114 having a record of first client interface device settings (e.g., first settings 116) for an electronic game.

The identity management server computer 102 is also configured to send a first game-entitlement confirmation message (e.g., first message 118) towards the game server computer 110 (e.g., via the computer network 104 such as the internet). The first message 118 includes the first client interface device settings 116 for the electronic game and a start-game authorization command (e.g., start game 120) to instruct the game server computer 110 to send a game stream 122 of the electronic game towards (e.g., via the computer network 104) the first client computing device 106 and to accept first input commands (e.g., first device input 124) from a first client interface device 126 configured to alter the game stream, the first input commands 124 mapped according to the first client interface device settings 116.

The identity management server computer 102 is further configured, upon receiving a game stream-share authorization message (e.g., stream-share 128) from the first client computing device 106, to retrieve from the data store 112, a second client account profile (e.g., second profile 130) and to send a second game-entitlement confirmation message (e.g., second message 132) towards the game server computer 110.

The second client account profile 130 is associated with account login information provided from a second one of the client computing devices 106. The second profile 130 has a record of second client interface device settings (e.g., second settings 134) for the electronic game.

The second game-entitlement confirmation message 132 includes the second client interface device settings for the electronic game and an enter-game authorization command (e.g., enter game 135). The enter-game authorization command instructs the game server computer 110 to send the on-going game stream 122 towards the second client computing device 108, and, to accept second input commands (e.g., second device input 136) from a second client interface device 138 to alter the on-going game stream 122, the second input commands 136 mapped according to the second client interface device settings 134.

As used herein, the terms records and profiles, e.g., the first and second interface device settings 116, 134, or the first and second account profiles 114, 130, refer to binary data files that can be saved to, and retrieved from, the memory (e.g., RAM) of binary data storage media (e.g., the data store 112). Non-limiting examples of data stores include hard disk drives, solid state drives, removable storage drives, such as floppy disk drives, magnetic tape drives, or a compact disk drives or other storage familiar to those skilled in the pertinent arts. One skilled in the art would understand how such binary data could be communicated over the computer network 104, e.g., via a transmission control protocol/ internet protocol, or similar protocols, which can connect the server computers 102, 110 and client devices 106, 108.

The first and second account profiles 114, 130 can include binary data files that hold information that identifies a specific client device, a listing of the electronic games the client device is entitled to play (e.g., a listing of paid subscriptions or purchases of the electronic games) and the records for the first and second client interface device settings 116, 134. Non-limiting examples of control client interface devices 126, 138 include a mouse, keyboard, touch screen, joystick or game pad or combinations of such devices. Non-limiting examples of device settings 116, 134 include setting to control the look or actions of the control client interface devices 126, 138 such as: a virtual mouse look (e.g., standard or inverted display looks) or key sequences, touch or game pad or joystick movements defining specific actions a game character, or some other feature, may take as part of the electronic game (e.g., crouch, shoot, reload or run).

As used herein, the term messages (e.g., first and second messages 118, 132 stream-share messages 128, first and second game entitlement confirmation messages 118, 132) and commands (e.g., start-game 120 commands and first and second input commands 124, 136) and game stream (e.g., the game stream 122) refer to sequences of digitally encoded signals sent as data-packets (e.g., network-packets) for communication between data-sending and data-receiving computers via the computer network 104. Embodiments of the game stream 122 can include data-packets representing video and/or audio presentations of the electronic game.

The computer network 104 can be any telecommunications network capable of communicating the encoded data-packets between the computing devices of the system 100. Non-limiting examples of the computer network 104 include local area networks (LAN), wireless networks, wide area networks (WAN) such as the Internet, peer-to-peer networks, and cable networks. Embodiments of the computer network 104 can include a series of interconnected and shared computing, storage and transmission devices (e.g., a cloud network 114) that facilitate communication of the encoded data packets between the server computing devices and/or the client computing devices (e.g., servers 102, 110 and devices 106, 108). Examples of client computing devices 106, 108 connectable to the identity management server computer 102 and game server computer 110 include, but are not limited to, mobile devices, e.g., laptop computers, phones such as smart phones, tablet computers, and, non-mobile devices, e.g., desktop computers, workstations or gaming consoles. Embodiments of the computing devices in the system 100 may be entirely different devices from each other and may include different types of interface devices to play the game. For instance, the first device 106 may be a personal computer which uses a mouse and keyboard as the interface devices 126 to play the game, which the second device 108 may be a smart phone which uses a touch screen as the interface device 138 to play the game.

As further illustrated in FIG. 1 some embodiments of the system 100 further include the game server computer 110. The game server computer 110 is connectable by the computer network 104 to the plurality of end-user computing devices 106, 108. Embodiments of the game server computer 110 can include a data store 140 holding a copy of electronic game software (e.g., in a game database 142) corresponding to the electronic game being played and an electronic processing unit (e.g., electronic processor unit 144, such as a CPU, GPU or both working in tandem) in communication with the data store 140. The processor unit 144 is configured such that, when receiving the start-game authorization command 120, the unit 144 compiles the electronic game software to generate the game stream 122.

In some embodiments, the electronic processing unit 144 is configured such that a relinquish-control command (e.g., release control 146), sent as part of the second game-entitlement confirmation message 132, causes the processing unit 144 to not execute the first input commands 124 from the first client interface device 126 whenever the second input commands 136 from the second client interface device 138 are received by the game server computer 110.

In some embodiments, the electronic processing unit 144 is configured such that upon the game server computer 110 receiving a resume-control message (e.g., resume control 146) from the first client interface device 106, the resume-control message 146 causes the processing unit 144 to execute the first input commands 124 from the first client interface device 126 and to not execute the second input commands 136 from the second client interface device 138.

In some embodiments, the person operating the second client interface device 138 can be the experienced player of the electronic game who is giving their instructions to an inexperienced player operating the first client interface device 126. In some such embodiments, the second user interface device settings 134 may have been defined as part of a past compilation (or multiple compilations) of the electronic game. In some embodiments, for instance, a copy of the electronic game software was loaded from the data store 140 and complied by the processing unit 144 of the game server computer 110. The experienced player then developed and defined the second user interface device settings 134 as part of playing the game previous to commencing the on-game stream 122, e.g., using the second client computing device 136 and operating the second client interface device 138. In other embodiments, the experienced player may have purchased or licensed a copy of the electronic game software. In such embodiments, the electronic game software may be loaded from a data store 150 of the second client computing device 150 and the past compilation is made on an electronic processing unit 152 of the second client computing device 108.

In some embodiments, the person operating the second client interface device 138 can be the inexperienced player of the electronic game who is receiving instructions from an experienced player operating the first client interface device 126. In some such embodiments, the experienced player could have developed and defined the first user interface device settings 116 as part of playing the game previous to the on-game stream 122, e.g., using the second client computing device 106 and operating the second client interface device 126, e.g., by loading the game from a data store 155, doing the past compilation on an electronic processing unit 157 of the first client computing device 106. In some embodiments, however, the second user interface device settings 134 can be defined after the second client computing device 138 receives the on-going game stream 122, e.g., initiated by the experienced player operating the first client interface device 126.

Alternatively, in some embodiments, the person operating the second client interface device 138 can be a player who is experienced playing electronic games, in general, but who has not played the specific electronic game started by the inexperienced player operating the first client interface device 126. In some such embodiments, as part of the on-going game stream 122, the experienced playing defines the second user interface device settings 134, e.g., based on settings they have used as part of playing different electronic games.

In some embodiments, e.g., to make the instructions more effective, it may be desirable for the experienced player take over control of a same feature (e.g., the actions of a same game character) of game that the inexperienced player was trying to learn how to control. In some such embodiments, the second device input commands 136 from the second client interface device 138 includes commands to control the actions of a same feature in the on-going game stream 122 that the first client interface device input commands 124 had been controlling prior to sending the game stream-share authorization message 128.

To facilitate initiating a request to receive instructions on how to play an on-going game-stream, it may be desirable to provide a list of other players to the player that initiated the game. In some such embodiments, the identity management server computer 102 is further configured to send a game-share message (share message 160) towards the first client computing device 106. The game-share message can include a client list 162 displayable on the first client computing device 106, e.g., on a same display unit 164 of the device 106 that the on-going game stream is displayed on. The client list 162 can be generated from a client database 166 of other ones of the client computing devices 104, 106 . . . that are eligible to play the electronic game and that are also identified in the first client account profile 114, the client database 166 held in the data store 112 of the identity management server computer 102. In some such embodiments, the client list 162 can further indicate an experience level (e.g., hours of playing time, game levels or scores achieved) associated with the other ones of the client computing devices 104, 106 . . . .

In some embodiments, to ensure that the game stream is on-going, before share the game, the identity management server computer 102 can be configured to send the game-share message 160 after receiving a game-started confirmation message (e.g., game started 168) from the game server computer 110.

In some embodiments, the selection of one of the client computing devices 106 from the client list causes the game stream-share authorization message 128 to be sent from the first computing device 106 towards the identity management server computer 102 and on to the selected client device 106.

Alternatively, in some embodiments, the first client device 106 and the game server device 110 can be a same unified computing device. For instance, the first client computing device 106 can be configured to include all of the same functions, and have the same communications with the identity management computer 102 and second client interface device 138, as ascribed to the game server computer 110. Or the game server computer 110 can include all of the same functions and have the same communications with the identity management computer 102 as the first client computing device 106. In such embodiments of the unified device 106, 110, for example, the electronic processing units 144, 157 are the same processing units and the data stores 142, 155 are the same data stores, with the game data base stored therein, and, the first device input command 124 and resume control message 146 are commands and messages that are internal to the unified device 106, 110. In such embodiments of the unified device 106, 110, for example, the game stream 122 can be sent from the unified device 106, 110 to the second client device 108 via a peer-to-peer network 114.

Another aspect of the invention is a method for dynamically controlling user interface device settings for an electronic game playable by multiple players over a computer network.

FIG. 2 presents a flow diagram of example embodiments of a method 200 for dynamically controlling user interface device settings for an electronic game played by multiple players over a computer network, according to the principles of the present invention. FIGS. 3-5 present block diagrams of an example embodiment of the electronic computer system 100 such as depicted in FIG. 1 at different stages in the method 200.

With continuing reference to FIGS. 1-5 throughout, the example method 200, the method 200 comprises, retrieving, in step 202, from a data store 112 of the identity management server 102 (e.g., IDM server), a first client account profile 114 associated with the account login information (e.g., following a first client computing device login 302, FIG. 3), the first client account profile 114 having a record of first client interface device settings 116 for an electronic game. The method 200 also comprises, in step 206, sending a first game-entitlement confirmation message 118 from the identity management server 102 towards a game server computer 110 (e.g. game server) via a computer network 104. The first message 118 includes the first client interface device settings 116 for the electronic game and a start-game authorization command 120 that causes the game server computer 102, in step 207, to send a game stream 122 of the electronic game towards the first client computing device 104 and to accept input commands 124 from a first client interface device 126 to alter the game steam 122, the input commands mapped according to the first client interface device settings 116.

As illustrated in FIGS. 2 and 4, the method 200 further comprises, in step 208, receiving to the identity management server 102, a game stream-share authorization message 160 from the first client computing device 106. In response to step 208, the identity management server 102 retrieves, in step 210, from the data store 112, a second client account profile 130 associated with account login information (e.g., a second computing device login 402, FIG. 4) provided from a second one of the client computing devices 108, the second client account profile 130 having a record of second client interface device settings 134 for the electronic game. Also in response to step 208, the identity management server 102 sends, in step 212, a second game-entitlement confirmation message 132 towards the game server computer 110. The second message 132 includes the second client interface device settings 134 for the electronic game and an enter-game authorization command 135. The enter-game authorization command 135 causes the game server computer to send in step 214, the on-going game stream 122 towards the second client computing device 108 and to accept input commands 136 from a second client interface device 138 to alter the on-going game steam 122, the input commands 136 mapped according to the second client interface device settings 134.

As further illustrated FIGS. 2 and 3, in some embodiments, the method 200 further includes, in step 216, receiving by the game server computer 110, the first game-entitlement confirmation message 118 (e.g., sent in step 206 by the IDM server 102). Upon receiving the message 118 (step 216) the game server computer 102, in step 218 retrieves from a data store 140 of the game server computer 110, electronic game software corresponding to the electronic game. Upon receiving the message 118 (step 216) the game server computer 102 also, in step 219, compiles, in an electronic processing unit 144 of the game server computer 110, the electronic game software to generate the game stream 122 sent to the first client device 106 in step 207.

In some embodiments, the enter-game authorization command, sent as part of the second game-entitlement confirmation message 132, in step 212 includes a relinquish-control command that instructs the electronic processing unit 142 to not execute the first input commands 124 from the first client interface device 126 whenever the second input commands 136 from the second client interface device 138 are received by the game server computer 110. However, the first client device 106 can still receive the on-going game stream 122 for viewing (e.g., in accordance with step 207).

In some embodiments of the method 200, the input commands 136 from the second client interface device 138 includes commands to control actions of a same feature in the on-going game stream 122 that the first client interface device input commands 126 had been controlling prior to the sending of the game stream-share authorization message 128 from the first client computing device 106.

Similar to that described in the context of FIG. 1, in some embodiments of the method 200, the second user interface device settings 134 can be defined as part of a past compilation of the electronic game, while in other embodiments, the second user interface device settings 134 are defined after the second client computing device 108 receives the on-going game stream 122.

As further illustrated FIGS. 2 and 5, some embodiments of the method 200 further include including receiving by the game server computer 110, in step 220, a resume-control command 144, e.g., sent from the first client interface device 126, the electronic processing unit 142 is configured to execute the first input commands 124 from the first client interface device 126 (e.g., in accordance with step 207) and to not execute the second input commands 136 from the second client interface device 138. However, the second client device 108 can still receive the on-going game stream 122 for viewing (e.g., in accordance with step 214).

Control of the on-going game stream 122 can be dynamically switched between the devices 106, 108 upon the game server computer 110 alternately receiving the second game-entitlement confirmation message (step 212) and the resume control command message (step 220).

As further illustrated in FIGS. 2 and 5, some embodiments of the method 200 include sending, in step 222, from the identity management server 102, a game-share message 160 towards the first client computing device 104, the game-share message 160 including a client list 166, the client list 162 generated from a client database 164 of the client computing devices 104, 106, . . . that are eligible to play the electronic game and that are identified in the first client account profile 114, the client database 164 held in the data store 112 of the identity management server 102. Similar to that discussed in the context of FIG. 1, the game-share message can be sent in step 222 after receiving a game-started confirmation message 168, sent in step 224, from the game server computer 102. Some embodiments of the method 200 include sending a selection of one of the other client computing devices 106, . . . on the client list 164, from the first client computing device 106 towards the identity management server 102, as part of sending a game-share authorization message in step 226. Upon receiving the selection made in step 208 the identity management server 102 sends the game stream-share authorization message from the first computing device 104 towards the identity management server computer 102.

In some alternative embodiments, where the game server 110 and first client device are the same unified device 106, 110, then the steps of the method 200 ascribed to the game server or first device are performed by the unified device 106, 110 and commands and messages of the method 200 sent toward or received to the game server or first device are sent toward or received to the unified device 106, 110.

Those skilled in the art to which this application relates will appreciate that other and further additions, deletions, substitutions and modifications may be made to the described embodiments.

What is claimed is:

1. An electronic computing system for dynamically controlling user interface device settings for an electronic game playable by multiple players over a computer network, comprising:

an identity management server computer connectable by a computer network to a plurality of client computing devices and a game server computer, wherein the identity management server computer is configured to:
retrieve, from a data store, a first client account profile associated with account login information provided from a first one of the client computing devices, the first client account profile having a record of first client interface device settings for an electronic game,
send a first game-entitlement confirmation message towards the game server computer, the first message including the first client interface device settings for the electronic game and a start-game authorization command to instruct the game server computer to send a game stream of the electronic game towards the first client computing device and to accept first input commands from a first client interface device configured to alter the game stream, the first input commands mapped according to the first client interface device settings, and
upon receiving a game stream-share authorization message from the first client computing device:
retrieve from the data store, a second client account profile associated with account login information provided from a second one of the client computing devices, the second client account profile having a record of second client interface device settings for the electronic game, and
send a second game-entitlement confirmation message towards the game server computer, the second message including the second client interface device settings for the electronic game and an enter-game authorization command to instruct the game server computer to send the on-going game stream towards the second client computing device and to accept second input commands from a second client interface device to alter the on-going game stream, the second input commands mapped according to the second client interface device settings, wherein the altered on-going game stream of the second client computing device is displayed on the first client computing device.

2. The system of claim 1, further including the game server computer, the game server computer connectable by the computer network to the plurality of end-user computing devices, the game server computer including:
a data store holding a copy of electronic game software corresponding to the electronic game; and
an electronic processing unit coupled to the data store, wherein the processing unit is configured such that, when receiving the start-game authorization command, the processing unit compiles the electronic game software to generate the game stream.

3. The system of claim 1, wherein the enter-game authorization command includes a relinquish-control command that causes the electronic processing unit to not execute the first input commands from the first client interface device whenever the second input commands from the second client interface device are received by the game server computer.

4. The system of claim 2, wherein, upon the game server computer receiving, a resume-control message from the first client interface device, the resume-control message causes the electronic processing unit to not execute the second input commands from the second client interface device.

5. The system of claim 1, wherein the second user interface device settings were defined as part of a past compilation of the electronic game.

6. The system of claim 5, wherein the past compilation of the electronic game includes loading electronic game software from a data store, and compiling the software on an electronic processing unit, of the game server computer.

7. The system of claim 5, wherein the past complication of the electronic game includes loading electronic game software loaded from a data store and compiling the software on an electronic processing unit of the second client computing device.

8. The system of claim 1, wherein the second user interface device settings are defined after the second client computing device receives the on-going game stream.

9. The system of claim 1, wherein the input commands from the second client interface device includes commands to control actions of a same feature in the on-going game stream that the first client interface device input command had been controlling prior to sending the game stream-share authorization message.

10. The system of claim 1, wherein the identity management server computer is further configured to send a game-share message towards the first client computing device, the game-share message including a client list displayable on the first client computing device, the client list generated from a client database of other ones of the client computing devices that are eligible to play the electronic game and that are identified in the first client account profile, the client database held in the data store of the identity management server computer.

11. The system of claim 10, wherein the identity management server computer is configured to send the game-share message after receiving a game-started confirmation message from the game server computer.

12. The system of claim 10, wherein selection of one of the client computing devices from the client list causes the game stream-share authorization message to be sent from the first computing device towards the identity management server computer.

13. A method for dynamically controlling user interface device settings for an electronic game playable by multiple players over a computer network, comprising:
retrieving from a data store of the identity management server computer, a first client account profile associated with the account login information, the first client account profile having a record of first client interface device settings for an electronic game;
sending a first game-entitlement confirmation message from the identity management server computer towards a game server computer via a computer network, the first message including the first client interface device settings for the electronic game and start-game instructions that causes the game server computer to send a game stream of the electronic game towards the first client computing device and to accept input commands from a first client interface device to alter the game steam, the input commands mapped according to the first client interface device settings;
receiving to the identity management server computer, a game stream-share authorization message from the first client computing device, whereupon the identity management server computer:
retrieves from the data store, a second client account profile associated with account login information provided from a second one of the client computing devices, the second client account profile having a record of second client interface device settings for the electronic game, and
sends a second game-entitlement confirmation message towards the game server computer, the second message including the second client interface device settings for the electronic game and an enter-game authorization command that causes the game server computer to send the on-going game stream towards the second client computing device and to accept input commands from a second client interface device to alter the on-going game steam, the input commands mapped according to the second client interface device settings, wherein the altered on-going game stream of the second client computing device is displayed on the first client computing device.

14. The method of claim 13, further including:
receiving, by the game server computer, the first game-entitlement confirmation message, whereupon the game server computer:
retrieves, from a data store of the game server computer, electronic game software corresponding to the electronic game; and
compiles, in an electronic processing unit of the game server computer, the electronic game software to generate the game stream.

15. The method of claim 14, wherein the enter-game authorization command includes a relinquish-control command that instructs the electronic processing unit to not execute the first input commands from the first client interface device whenever the second input commands from the second client interface device are received by the game server computer.

16. The method of claim 14, further including receiving, by the game server computer, a resume-control command message from the first client interface device, whereupon the electronic processing unit is configured to execute the first input commands from the first client interface device and to not execute the second input commands from the second client interface device.

17. The method of claim 13, wherein the second user interface device settings were defined as part of a past compilation of the electronic game.

18. The method of claim 13, wherein the second user interface device settings are defined after the second client computing device receives the on-going game stream.

19. The method of claim 13, wherein the input commands from the second client interface device includes commands to control actions of a same feature in the on-going game stream that the first client interface device input commands had been controlling prior to the game stream-share authorization message.

20. The method of claim 13, further including:
sending, from the identity management server computer, a game-share message towards the first client computing device, the game-share message including a client list, the client list generated from a client database of the client computing devices that are eligible to play the electronic game and that are identified in the first client account profile, the client database held in the data store of the identity management server computer.

* * * * *